United States Patent
Ritter et al.

(10) Patent No.: US 9,520,808 B2
(45) Date of Patent: Dec. 13, 2016

(54) METHOD AND SYSTEM FOR POWER CONVERSION

(71) Applicant: General Electric Company, Schenectady, NY (US)

(72) Inventors: Allen Michael Ritter, Roanoke, VA (US); Robert Allen Seymour, Roanoke, VA (US); Rajib Datta, Niskayuna, NY (US); John Douglas D'Atre, Vancouver, WA (US)

(73) Assignee: General Electric Company, Schenectady, NY (US)

(*) Notice: Subject to any disclaimer, the term of this patent is extended or adjusted under 35 U.S.C. 154(b) by 84 days.

(21) Appl. No.: 14/288,067

(22) Filed: May 27, 2014

(65) Prior Publication Data

US 2014/0268960 A1    Sep. 18, 2014

Related U.S. Application Data

(63) Continuation of application No. 12/983,574, filed on Jan. 3, 2011, now Pat. No. 8,736,207.

(51) Int. Cl.
*H02P 6/06* (2006.01)
*H02M 7/5387* (2007.01)
*H02P 27/06* (2006.01)
*H02M 1/40* (2007.01)
*H02P 27/10* (2006.01)
*H02P 27/12* (2006.01)

(52) U.S. Cl.
CPC .......... *H02M 7/53873* (2013.01); *H02P 27/06* (2013.01); *H02M 1/40* (2013.01); *H02P 27/10* (2013.01); *H02P 27/12* (2013.01)

(58) Field of Classification Search
CPC .................................... H02P 6/06; H02P 6/16
USPC ...................................................... 318/400.06
See application file for complete search history.

(56) References Cited

U.S. PATENT DOCUMENTS

| | | | |
|---|---|---|---|
| 3,808,545 | A | 4/1974 | Stanley |
| 4,403,198 | A | 9/1983 | Müller |
| 4,404,526 | A | 9/1983 | Kirn |
| 4,449,087 | A | 5/1984 | Lippitt et al. |

(Continued)

FOREIGN PATENT DOCUMENTS

| CN | 1173067 A | 2/1998 |
|---|---|---|
| CN | 101630939 A | 1/2010 |

(Continued)

OTHER PUBLICATIONS

"Unofficial English translation of Office Action issued in connection with corresponding CN Application No. 201210012715.X on Jan. 5, 2015".

(Continued)

*Primary Examiner* — Erick Glass
(74) *Attorney, Agent, or Firm* — Armstrong Teasdale LLP

(57) ABSTRACT

A method and system for a control circuit are provided. The circuit includes an integrating counter coupled to a process wherein the integrating counter is configured to integrate over time a process parameter signal received from the process and to generate a trigger signal when the integrated signal equals a predetermined count. The control circuit also includes a transition controller electrically coupled to a respective control element and configured to receive the trigger signal generated by the integrating counter.

20 Claims, 2 Drawing Sheets

(56) References Cited

U.S. PATENT DOCUMENTS

| | | | |
|---|---|---|---|
| 4,628,275 A | 12/1986 | Skipper et al. | |
| 4,864,483 A | 9/1989 | Divan | |
| 5,198,972 A | 3/1993 | Lafuze | |
| 5,619,406 A | 4/1997 | Divan et al. | |
| 5,796,231 A * | 8/1998 | Kyodo | H02P 6/183 318/608 |
| 5,929,663 A * | 7/1999 | Dougherty | H02J 13/0037 327/101 |
| 6,243,034 B1 | 6/2001 | Regier | |
| 6,263,738 B1 * | 7/2001 | Hogle | G01M 1/22 73/593 |
| 6,590,447 B1 | 7/2003 | Willis | |
| 7,511,439 B2 | 3/2009 | Bosch et al. | |
| 7,692,394 B2 | 4/2010 | Hill et al. | |
| 8,269,442 B2 | 9/2012 | Spirk et al. | |
| 9,140,206 B2 * | 9/2015 | Mc Donald | F02D 41/40 |
| 2008/0258673 A1 | 10/2008 | Welchko et al. | |
| 2009/0189446 A1 | 7/2009 | Lindsey et al. | |

FOREIGN PATENT DOCUMENTS

| | | |
|---|---|---|
| CN | 101291132 B | 4/2013 |
| EP | 0808016 A1 | 11/1997 |
| JP | 0866079 A | 3/1996 |
| JP | 2003153549 A | 5/2003 |
| JP | 2007306709 A | 11/2007 |

OTHER PUBLICATIONS

Unofficial English Translation of Japanese Office Action issued in connection with corresponding JP Application No. 2011-287518 on Jan. 26, 2016.

* cited by examiner

METHOD AND SYSTEM FOR POWER CONVERSION

CROSS REFERENCE TO RELATED APPLICATIONS

This application is a continuation of U.S. Non-provisional patent application Ser. No. 12/983,574, filed Jan. 3, 2011 and published as U.S. Patent Publication No. 2012/0169259, the disclosures of which are incorporated herein by reference in their entireties.

BACKGROUND OF THE INVENTION

The field of the invention relates generally to power converters, and more specifically, to a system and method for commutating of power bridges for which switching is highly-constrained in time to the desired output waveform.

Improvement of control convergence in power converters benefits from a minimization of the latency between measurement and the discrete opportunities for enforcement. At least some known power converter commutation circuits rely on past performance of the bridge to determine future switching times. Such circuits and methods are inaccurate in high frequency applications where relatively slower switching components are used. Additionally, such schemes do not account for disturbance signals that may be present while maintaining high efficiency.

Known machine control typically applies a voltage that emulates a phasor with a constant magnitude and frequency for bandwidths beyond that of the current regulator (or other primary regulator). Even in steady-state, switched-mode power supplies produce predictable errors in voltage and volt-seconds, and in both radial and circumferential axes. Further, transient bandwidth typically suffers from traditional approaches to reduce these errors, particularly when applied to power bridges with significant limitations in net switching frequency.

Methods of gating a highly-constrained power bridge typically involve very low chopping frequencies or pattern firing. Low chopping frequencies tend to constrain the maximum fundamental frequency of the applied waveform. Pattern firing techniques tend to limit the responsiveness of outer regulators.

BRIEF DESCRIPTION OF THE INVENTION

In one embodiment, a control circuit includes an integrating counter coupled to a process wherein the integrating counter is configured to integrate over time a process parameter signal received from the process and to generate a trigger signal when the integrated signal equals a predetermined count. The control circuit also includes a transition controller electrically coupled to a respective control element and configured to receive the trigger signal generated by the integrating counter.

In another embodiment, a method of controlling a process system includes integrating a process parameter signal, the process parameter signal including a process parameter component and a disturbance component, to generate an integrated parameter value, comparing the integrated parameter value to a predetermined threshold, and triggering a switching of a control device when the integrated parameter value equals the predetermined threshold.

In yet another embodiment, a process system includes an input assembly configured to receive a process parameter and generate a process parameter signal relative to the process parameter wherein the input assembly includes at least one converter. The process system also includes an output assembly including a respective control element coupled to a respective process element and a control unit configured to monitor a convergence of the process parameter signal towards a setpoint that triggers a transition in an output of the output assembly.

BRIEF DESCRIPTION OF THE DRAWINGS

FIG. 1 is a schematic block diagram of a power converter system (PCS) in accordance with an exemplary embodiment of the present invention; and FIG. 2 is a schematic block diagram of a method of commutating a power converter in accordance with an exemplary embodiment of the present invention.

DETAILED DESCRIPTION OF THE INVENTION

The following detailed description illustrates embodiments of the invention by way of example and not by way of limitation. It is contemplated that the invention has general application to analytical and methodical embodiments of commutating power conversion systems in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Embodiments of the present invention utilize real-time conditions to drive enforcements without excessive delay. Such conditions are satisfied using a relatively simple, mechanize-able transition controller, based on real-time measurements that account for conditions including disturbances. The disturbances of most concern are those which influence system divergence within an enforcement period.

The simple, mechanize-able transition controller includes a mechanism which does not rely upon a frozen assessment of previous conditions extrapolated into the time in the future when switching would occur if the system remained converged on the system variables that are likely to have changed, is able to evaluate the progression of conditions towards the transition time, and makes a continuous comparison of conditions to a setpoint to trigger the transition.

Embodiments of the present invention use an accumulation of volt-seconds, such as output phase voltage, which naturally includes disturbances in DC Link voltage, the influence of commutating circuits and power devices. In an exemplary embodiment, a modulator consistent with a circulating current (opposing bridges) biased-cosine phase controller is used.

Two important machine-compliant converter measurements are Radial and Circumferential Volt-second (Flux) Errors. Uncontrolled errors of these types are highly-related to undesirable heating currents, torque errors, and magnetizing errors, all of which are stressors for the machine.

These flux error terms are continuous time integrals of the associated components of the net error vector between desired and actual voltage vectors. The ideal desired voltage in steady-state is a continuously-rotating vector of constant magnitude, and the actual applied waveform is described by a timed sequence of discrete vectors produced by the bridge. For a properly-formed applied waveform, both the radial and circumferential flux errors are zero-mean over a suitable time period.

Figure 1:
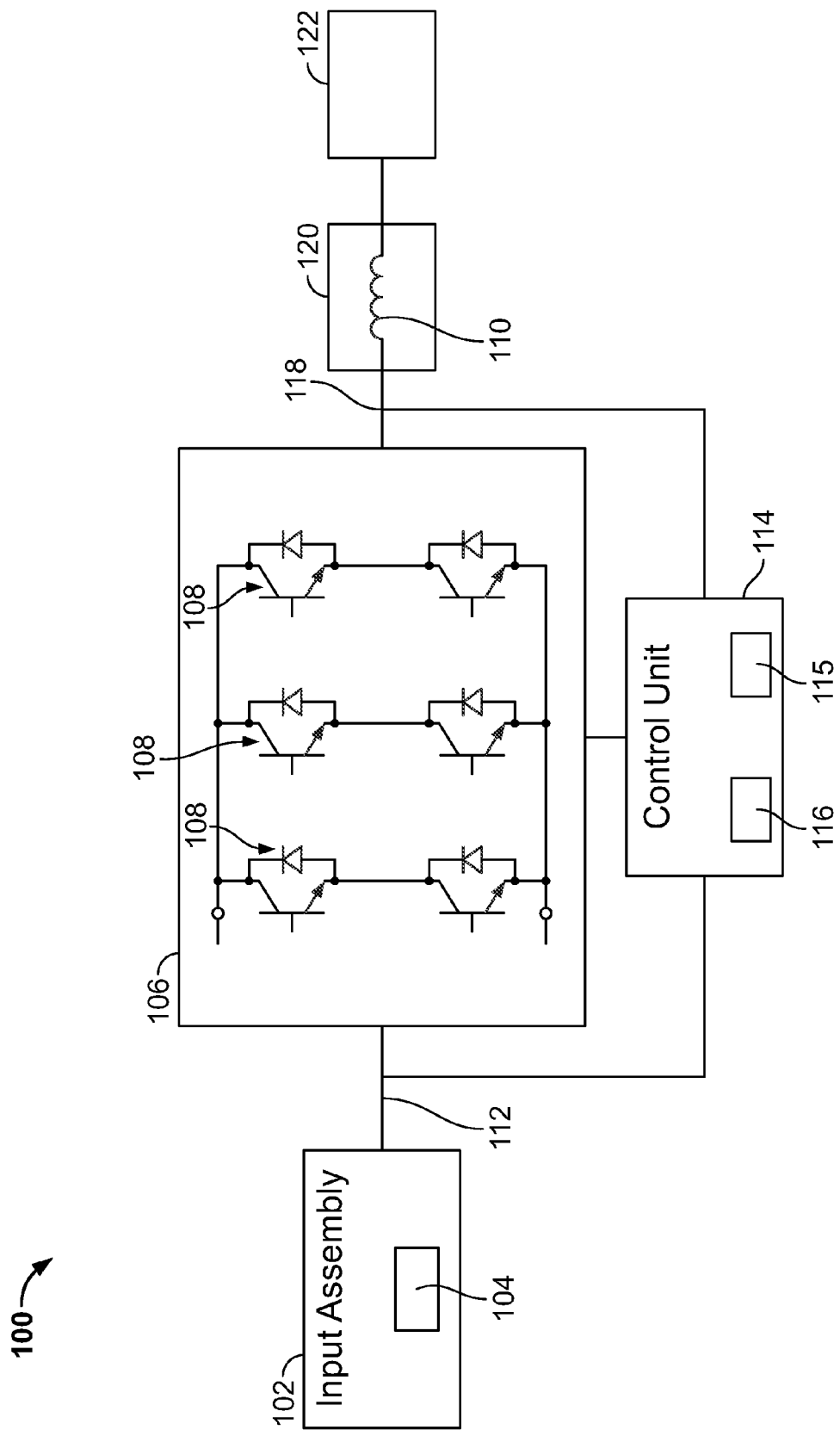
FIGS. 1-2 show exemplary embodiments of the method and system described herein.

FIG. 1 is a schematic block diagram of a power converter system (PCS) 100 in accordance with an exemplary embodiment of the present invention. In the exemplary embodiment, PCS 100 includes an input assembly 102 including at least one converter 104, which may include at least one three phase inverter, an output assembly 106 including plurality of transistor pairs 108 electrically coupled to respective motor windings 110, a direct current (DC) link 112 electrically coupled between input assembly 102 and output assembly 106. PCS 100 also includes a control unit 114 comprising a processor 115. Control unit 114 is configured to receive a voltage signal from DC link 112, integrate the voltage signal with respect to time to determine a volt-seconds value, increment a counter 116 at a predetermined volt-seconds value, and trigger a change of state of output assembly 106 using the incrementing of counter 116. In the exemplary embodiment, counter 116 comprises an integrating voltage counter that receives the voltage signal from DC link 112 and integrates the received voltage signal to generate a volt-seconds count. The volt-seconds count increments counter 116 to indicate when sufficient volt-seconds has entered output assembly 106 to manage current at an output 118 of PCS 100. In one embodiment, counter 116 may be embodied in a field programmable gate array (FPGA) device and driven by a sigma-delta modulator device. In an embodiment, respective motor windings 110 are positioned within, for example, an electric motor 120 for driving a load 122, such as, but not limited to, compressor. In various embodiments, respective windings 110 are positioned within other devices or components, such as, but not limited to, generators, utility transformer windings, and reactors.

Figure 2:
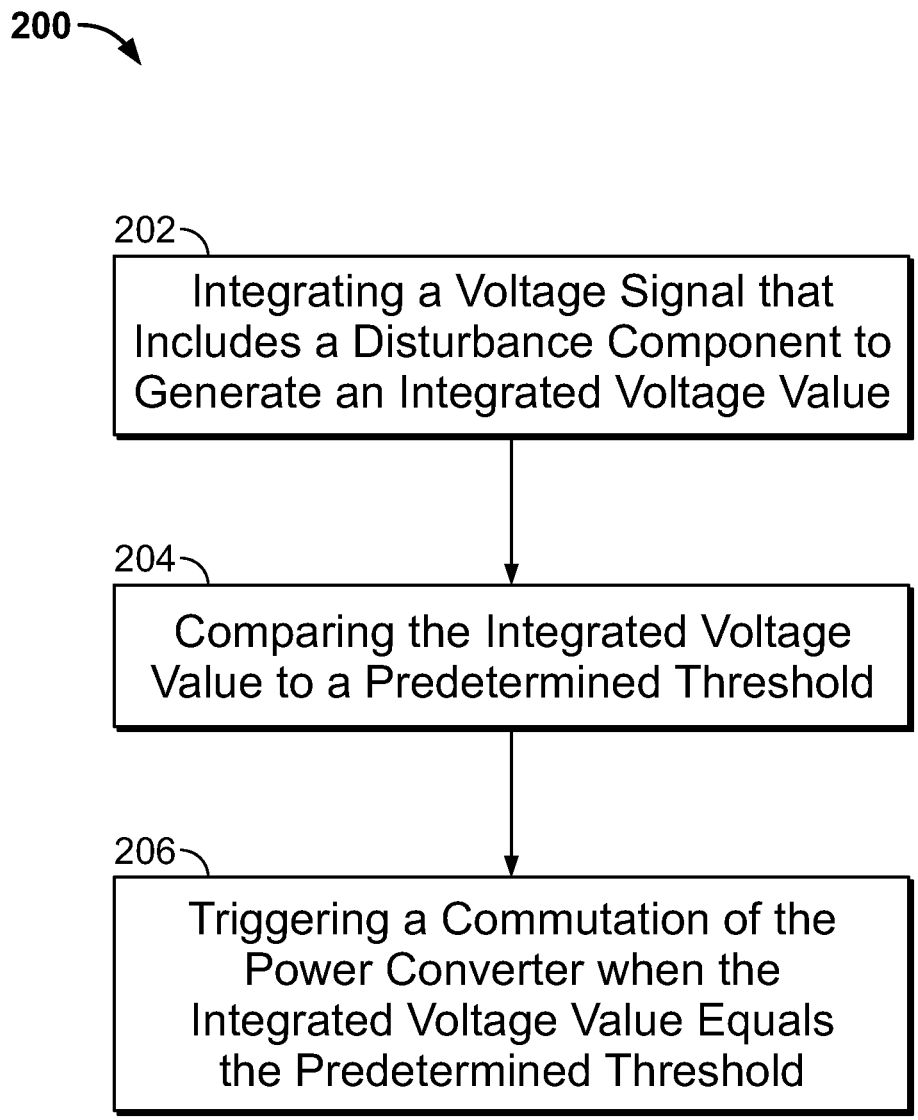

FIG. 2 is a schematic block diagram of a method 200 of commutating a power converter in accordance with an exemplary embodiment of the present invention. In the exemplary embodiment, method 200 includes integrating 202 a voltage signal that can include a disturbance component, to generate an integrated voltage value. In one embodiment, the disturbance component includes at least one of a noise component and an interference component. Method 200 also includes comparing 204 the integrated voltage value to a predetermined threshold, and triggering 206 a commutation of the power converter when the integrated voltage value equals the threshold, which results from desired voltage. In the exemplary embodiment, the integrated voltage of the DC link is measured in volt-seconds. When the integrating voltage counter meets or exceeds the threshold, this triggers a next state of the commutation circuit including the plurality of transistor pairs.

The term processor, as used herein, refers to central processing units, microprocessors, microcontrollers, reduced instruction set circuits (RISC), application specific integrated circuits (ASIC), field programmable gate arrays (FPGA), logic circuits, and any other circuit or processor capable of executing the functions described herein.

As used herein, the terms "software" and "firmware" are interchangeable, and include any computer program stored in memory for execution by processor 115, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is reducing errors in voltage and volt-seconds in both radial and circumferential axes without impacting transient bandwidth that may suffer from traditional approaches to reduce these errors, particularly when applied to power bridges with significant limitations in net switching frequency such that a high-fidelity waveform at the output of a power conversion system with significant switching limitations is facilitated. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a system and a method of commutating a power converter provides a cost-effective and reliable means for allowing the application of large power bridges in applications, which require high-fidelity and high-bandwidth management of electrical quantities. More specifically, the system and method described herein facilitate rejecting disturbances in DC Link voltage, the influence of commutating circuits and power devices, for the cases in which the output voltage is used, using an accumulation of volt-seconds to establish a commutation trigger using real-time conditions. In an exemplary embodiment, a modulator consistent with a circulating current (opposing bridges) biased-cosine phase controller is used. As a result, the system and method described herein facilitate generating a high-fidelity waveform at the output of the power conversion system in a cost-effective and reliable manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:
1. A control circuit comprising:
an integrating counter coupled to a process, said integrating counter configured to:
integrate over time a process parameter signal received from the process; and
generate a trigger signal when the integrated process parameter signal equals a predetermined threshold;
a transition controller electrically coupled to a respective control element and configured to:

receive the trigger signal generated by said integrating counter; and switch the control element based on the received trigger signal.

2. The control circuit of claim 1, wherein said integrating counter comprises a field programmable gate array (FPGA) device.

3. The control circuit of claim 1, wherein said integrating counter comprises a sigma-delta modulator device.

4. The control circuit of claim 1, wherein the trigger signal is configured to change a state of the respective control element from a first state to a second state.

5. The control circuit of claim 1, wherein said integrating counter is configured to:
receive a process parameter signal at an input;
integrate the process parameter signal to produce a pulse train;
increment a counter responsive to the pulse train.

6. The control circuit of claim 1, wherein the process parameter signal includes a disturbance component and the process parameter component, the disturbance component causing error in the process parameter signal.

7. The control circuit of claim 1, wherein the trigger comprises an integrating counter and a comparator configured to compare the integrated process parameter signal to a predetermined threshold and to generate the trigger signal when the integrated process parameter signal equals the predetermined threshold.

8. The control circuit of claim 7, wherein said integrating counter and said comparator are contained in a single programmable device.

9. The control circuit of claim 1, wherein the predetermined count is determined using at least one of a magnitude and phase of an output of said respective control element.

10. A method of controlling a process system, said method comprising:
integrating a process parameter signal to generate an integrated parameter value, the process parameter signal including a process parameter component and a disturbance component;
comparing the integrated parameter value to a predetermined threshold; and
triggering a switching of a control device when the integrated parameter value equals the predetermined threshold.

11. A method in accordance with claim 10, wherein the integrated parameter value comprises a disturbance component that influences a divergence of said process system within an enforcement period.

12. A method in accordance with claim 10, wherein integrating a process parameter signal comprises integrating a process parameter of a process system.

13. A method in accordance with claim 10, wherein triggering a switching of a control device comprises triggering a switching of a control device when a counter integrating the process parameter signal increments.

14. A method in accordance with claim 10, wherein integrating a process parameter signal comprises integrating a process parameter that includes a disturbance in the process parameter and an influence of the process and control devices.

15. A process system comprising:
an input assembly configured to:
receive a process parameter; and
generate a process parameter signal relative to the process parameter, said input assembly comprising at least one converter;
an output assembly comprising a respective control element coupled to a respective process element; and
a control unit configured to monitor a convergence of the process parameter signal towards a setpoint, the control unit configured to trigger a transition in an output of said output assembly prior to the process parameter signal reaching the setpoint.

16. A system in accordance with claim 15, wherein said control unit is configured to:
receive the process parameter signal from said input assembly;
integrate the process parameter signal with respect to time to produce a pulse train;
increment a counter responsive to the pulse train; and
trigger a change of state of said output assembly using the incrementing of the counter.

17. A system in accordance with claim 15, wherein said control unit comprises an integrating counter.

18. A system in accordance with claim 17, wherein said integrating counter comprises a field programmable gate array (FPGA) device.

19. A system in accordance with claim 17, wherein said integrating counter comprises a sigma-delta modulator device.

20. A system in accordance with claim 15, wherein said control unit is configured to trigger a switching of a process control device when a counter integrating the process parameter signal increments.

* * * * *